US010698965B2

(12) United States Patent
Sharma et al.

(10) Patent No.: US 10,698,965 B2
(45) Date of Patent: Jun. 30, 2020

(54) DATABASE QUERY BASED RECOMMENDATION ENGINE

(71) Applicant: SAP SE, Walldorf (DE)

(72) Inventors: Amit Sharma, Bangalore (IN); Anirban Chakraborty, Bangalore (IN); Sherwin Varghese, Bangalore (IN)

(73) Assignee: SAP SE, Walldorf (DE)

(*) Notice: Subject to any disclaimer, the term of this patent is extended or adjusted under 35 U.S.C. 154(b) by 470 days.

(21) Appl. No.: 15/619,336

(22) Filed: Jun. 9, 2017

(65) Prior Publication Data

US 2018/0357322 A1    Dec. 13, 2018

(51) Int. Cl.
*G06F 16/00* (2019.01)
*G06F 16/9535* (2019.01)
*G06F 16/9038* (2019.01)
*G06F 16/9035* (2019.01)
*G06Q 30/02* (2012.01)

(52) U.S. Cl.
CPC ...... *G06F 16/9535* (2019.01); *G06F 16/9035* (2019.01); *G06F 16/9038* (2019.01); *G06Q 30/02* (2013.01)

(58) Field of Classification Search
None
See application file for complete search history.

(56) References Cited

U.S. PATENT DOCUMENTS

| 8,930,392 | B1 * | 1/2015 | Leichter | G06F 16/3322 707/767 |
| 9,870,465 | B1 * | 1/2018 | Levi | H04L 67/306 |
| 2013/0218947 | A1 * | 8/2013 | Zur | G06Q 10/06 709/203 |
| 2014/0074824 | A1 * | 3/2014 | Rad | G06Q 50/01 707/722 |

* cited by examiner

*Primary Examiner* — Son T Hoang
(74) *Attorney, Agent, or Firm* — Mintz Levin Cohn Ferris Glovsky and Popeo, P.C.

(57) ABSTRACT

A method may include generating a first database query to retrieve user profiles from a database. The user profiles may include a first attribute and a second attribute associated with a plurality of users. Reference data may be generated based on the user profiles. The reference data may include matrix representations of the user profiles. A clustering technique may be applied to the reference data in order to determine that a first user is similar to a second user with respect to the first attribute. In response to determining that the first user is similar to the second user, a second database query may be generated to retrieve a user profile of the first user from the database. A first recommendation for the second user may be determined based on the user profile of the first user. The first recommendation may include the second attribute of the first user.

14 Claims, 5 Drawing Sheets

DATABASE QUERY BASED RECOMMENDATION ENGINE

TECHNICAL FIELD

The subject matter described herein relates generally to database processing and more specifically to a database query based recommendation engine.

BACKGROUND

A database may be configured to store a plurality of electronic data records. These data records are organized, in accordance with a database schema, into various database objects including, for example, one or more database tables. The database is coupled with a database management system (DBMS) that supports a variety of operations for accessing the data records held in the database. These operations may include, for example, structure query language (SQL) queries.

SUMMARY

Systems, methods, and articles of manufacture, including computer program products, are provided for a multi-dimensional controller. In one aspect, there is provided a method. The method may include: generating, by a recommendation engine, a first database query to retrieve a plurality of user profiles from a database, the plurality of user profiles including a first attribute associated with a plurality of users and a second attribute associated with the plurality of users; generating, by the recommendation engine, reference data, the reference data generated based at least on the plurality of user profiles, and the reference data comprising matrix representations of the plurality of user profiles; determining, by the recommendation engine applying a clustering technique to the reference data, that a first user is similar to a second user with respect to at least the first attribute; in response to determining that the first user is similar to the second user, generating, by the recommendation engine, a second database query to retrieve a user profile of the first user from the database; and determining, by the recommendation engine, a first recommendation for the second user, the first recommendation determined based at least on the user profile of the first user, and the first recommendation including the second attribute associated with the first user.

In some variations, one or more features disclosed herein including the following features can optionally be included in any feasible combination. The reference data may include a first matrix and a second matrix. The first matrix may include the first attribute associated with the plurality of users. The second matrix may include the second attribute associated with the plurality of users. The first attribute and the second attribute may be different types of attributes.

In some variations, the applying of the clustering technique may further determine that the first user is similar to the second user with respect to the second attribute. The applying of the clustering technique may further determine that the second user is similar to a third user with respect to the first attribute but not the second attribute. The recommendation engine may generate a third database query to retrieve a user profile of the third user. The recommendation engine may generate, based at least on the user profile of the third user, a second recommendation for the second user. The second recommendation may include the second attribute associated with the third user. The recommendation engine may prioritize the first recommendation over the second recommendation. The prioritizing may be based at least on the first user being similar to the second user with respect to both the first attribute and the second attribute.

In some variations, the clustering technique may be k-nearest neighbors. The recommendation engine may detect a change to at least one user profile at the database. In response to detecting the change, the recommendation engine may generate a third database query to retrieve, from the database, at least one user profile that has been changed. The recommendation engine may update the reference data based on the at least one user profile that has been changed.

In some variations, the recommendation engine may generate a graphic user interface for displaying the first recommendation. The recommendation engine may be implemented as a cloud service accessible to a first client and a second client. The first client may access a first instance of the recommendation engine and the second client may access a second instance of the recommendation engine.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In some example embodiments, a recommendation engine may be configured to generate recommendations for a target user. In order to generate recommendations for the target user, the recommendation engine may generate reference data that includes matrix representations of the user profiles stored at the database. The recommendation engine may further apply a clustering technique to the reference data. Applying the clustering technique may enable the recommendation engine to identify users who are similar to the target user. Recommendations of the target user may be generated based on users who are identified as being similar to the target user.

To generate the reference data, the recommendation engine may query the database to retrieve, from the database, at least a portion of the user profiles stored at the database. For example, the recommendation engine may retrieve a user profile from the database using a Structured Query Language (SQL) statement such as, for example, a SQL SELECT. Furthermore, the recommendation engine may update the reference data based on changes to the user profiles stored at the database. For instance, the recommendation engine may update the reference data when a user profile is added, deleted, and/or modified. Here, the recommendation engine may update the reference data when the recommendation engine detects a SQL statement that indicates a change to a user profile at the database including, for example, a SQL INSERT, a SQL DELETE, a SQL UPDATE, and/or the like.

Each user profile may include a plurality of attributes associated with a user including, for example, employment history, career objectives, and/or the like. In some example embodiments, the reference data may include matrix representations of these attributes. For example, the reference data may include a first matrix that corresponds to a first attribute such as, for example, the employment history of each of a plurality of users. Alternately and/or additionally, the reference data may include a second matrix that corresponds to a second attribute such as, for example, the career objectives of each of the plurality of users. The recommendation engine may apply a clustering technique to the first matrix in order to identify users who have a similar employment history as the target user. The recommendation engine may also apply a clustering technique to the second matrix in order to identify users who have career objectives as the target user. Recommendations for the target user may be determined based on users who have a similar employment history and/or career objectives as the target user.

Figure 1:
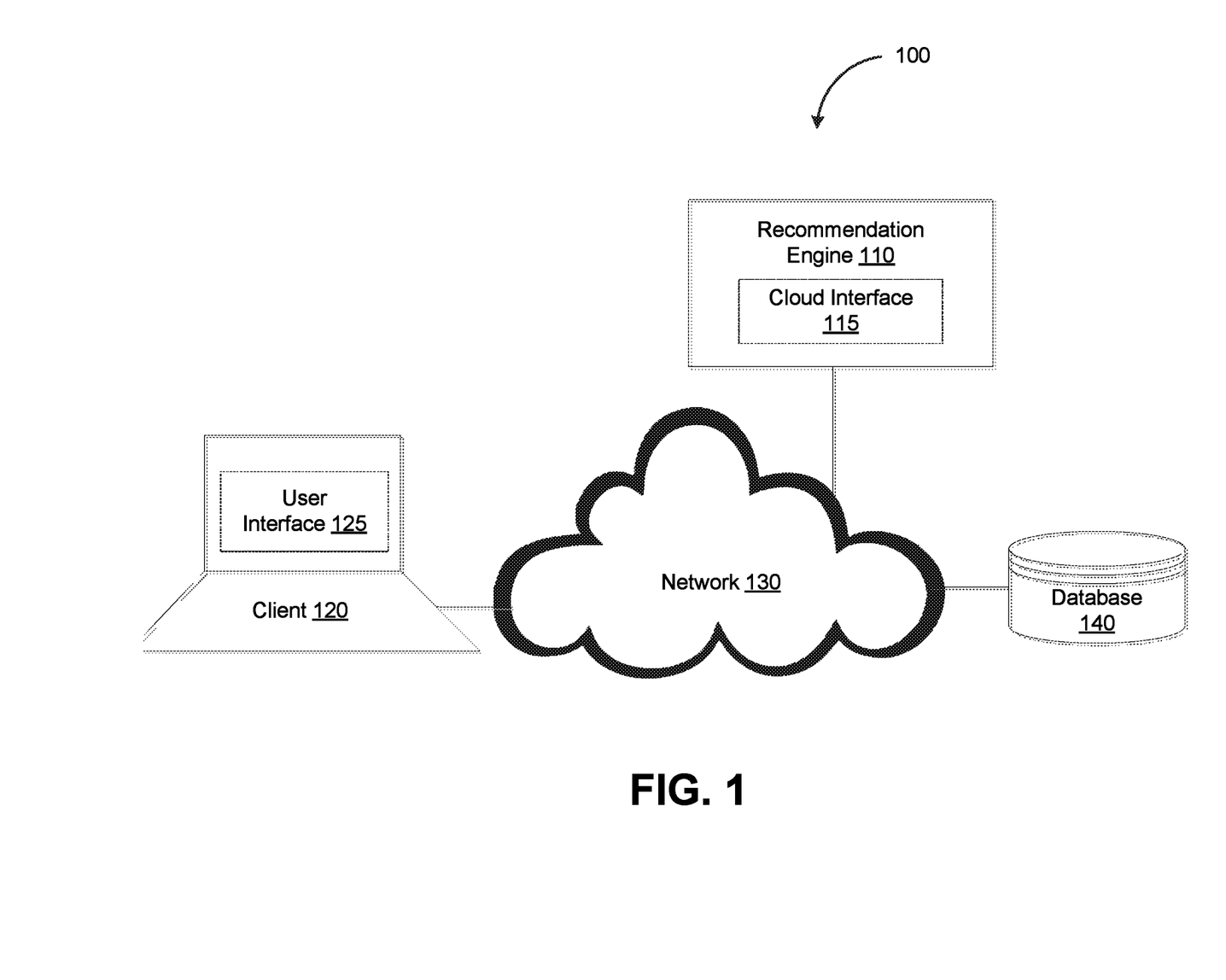
FIG. 1 depicts a system diagram illustrating a recommendation system, in accordance with some example embodiments.

FIG. 1 depicts a system diagram illustrating a recommendation system 100, in accordance with some example embodiments. Referring to FIG. 1, the recommendation system 100 may include a recommendation engine 110 that is communicatively coupled with a client 120 and a database 140. The client 120 may be a cellular phone, smart phone, a tablet, a laptop computer, a desktop, a workstation, and/or any other type of processor and memory based device. The network 130 may be any wired and/or wireless network including, for example, a public land mobile network (PLMN), a local area network (LAN), a wide area network (WAN), the Internet, and/or the like. The database 140 may include a database management system (DBMS) that is coupled with an in-memory database, a relational database, a non-SQL (NoSQL) database, and/or any other type of persistence.

The database 140 may store a plurality of records that may be accessed via one or more database queries such as, for example, SQL statements. The records stored at the database 140 may correspond to the user profiles of various users. In some example embodiments, the recommendation engine 110 may be configured to generate reference data based on the user profiles stored at the database 140. As such, the recommendation engine 110 may query the database 140 to retrieve the user profiles stored at the database 140. For example, the recommendation engine 110 may use a SQL statement, such as a SQL SELECT, to retrieve user profiles from the database 140.

In some example embodiments, the recommendation 110 may generate matrix representations of at least a portion of the user profiles retrieved from the database 140. As noted above, each user profile may include a plurality of attributes associated with a user including, for example, employment history, career objectives, and/or the like. Accordingly, the recommendation engine 110 may generate matrix representations of at least some of this plurality of attributes. For example, the recommendation engine 110 may generate a first matrix A that corresponds to a first attribute from the user profiles. The first attribute may be, for example, the employment history of each of the plurality of users. The first matrix A may be a m×n matrix denoted by Equation (1) below.

$$A = \begin{bmatrix} a_{1,1} & \cdots & a_{1,n} \\ \vdots & \ddots & \vdots \\ a_{m,1} & \cdots & a_{m,n} \end{bmatrix} \quad (1)$$

Each of the m quantity of rows in the first matrix A may be associated with a user. Meanwhile, each of the n quantity of columns in the first matrix A may correspond to a job position, a job title, a job description, and/or the like. An individual element $a_{m,n}$ from the first matrix A may be a value indicative of whether the m-th user has held the n-th job position, job title, and/or job description. As such, the values in the n quantity of columns in the m-th row of the first matrix A may represent the employment history of the m-th user. For example, each individual element $a_{m,n}$ may be a binary value. The element $a_{m,n}$ may be one value (e.g., "1") if the m-th user has held the n-th job position, job title, and/or job description. By contrast, the element $a_{m,n}$ may be a different value (e.g., "0") if the m-th user has not held the n-th job position, job title, and/or job description.

Alternately and/or additionally, the recommendation engine 110 may generate a second matrix B that corresponds to a second attribute from the user profiles. The second attribute may be, for example, the career objectives of each of the plurality of users. The second matrix B may be a x×y matrix denoted by Equation (2) below.

$$B = \begin{bmatrix} b_{1,1} & \cdots & b_{1,y} \\ \vdots & \ddots & \vdots \\ b_{x,1} & \cdots & b_{x,y} \end{bmatrix} \quad (2)$$

Each of the x quantity of rows in the second matrix B may be associated with a user. Meanwhile, each of the y quantity of columns in the first matrix B may correspond to a career objective. An individual element $b_{x,y}$ from the second matrix B may be a value indicative of a ranking associated with the y-th career objective. The ranking associated with the y-th career objective may correspond to how important that career objective is to the x-th user. To further illustrate, each individual element $b_{x,y}$ may be a value from a range of values. The element $b_{x,y}$ may be a higher value from the range of values if the y-th career objective is more important to the x-th user and has a correspondingly high ranking. By contrast, the element $b_{x,y}$ may be a lower value from the range of values if the y-th career objective is less important to the x-th user and has a correspondingly low ranking.

In some example embodiments, the recommendation engine 110 may update the reference data based on changes to the user profiles stored at the database 140 such that the reference data is synchronized with the user profiles stored at the database 140. For instance, the recommendation engine 110 may update the reference data in real time by detecting a SQL statement that changes a user profile stored at the database 140 including, for example, a SQL INSERT, a SQL DELETE, a SQL UPDATE, and/or the like. The recommendation engine 110 may update the reference data in response to the changes to the user profiles at the database 140. For example, the recommendation engine 110 may update the first matrix A and/or the second matrix B when one or more user profiles at the database 140 are added, removed, and/or modified. Alternately and/or additionally, the recommendation engine 110 may update the reference data periodically and/or in accordance with a predetermined schedule. The recommendation engine 110 may, for example, update the reference data on a weekly basis, monthly basis, a quarterly basis, and/or the like. Such updates may include updating the first matrix A and/or the second matrix B based on user profiles that are added, removed, and/or modified since the previous update.

The recommendation engine 110 may generate, based on the reference data, one or more recommendations. For example, the recommendation engine 110 may receive, from the client 130, a request to generate recommendations for a target user including, for example, recommendations of career objectives. It should be appreciated that the target user may be one of the plurality of users whose user profiles are used to generate the reference data. In response to the request from the client 130, the recommendation engine 110 may identify, based on the reference data, one or more career objectives to recommend to the target user.

In some example embodiments, the recommendation engine 110 may generate the recommendations by at least applying, to the reference data, a clustering technique such as, for example, connectivity-based clustering, centroid-based clustering, distribution-based clustering, and/or the like. For example, the recommendation engine 110 may generate the recommendations by applying a k-nearest neighbors algorithm with Pearson correlation and/or the like. Applying the clustering technique to the reference data may generate clusters of similar users who have one or more similar attributes. Thus, applying the clustering technique to the reference data may enable an identification of users who are similar to the target user. Recommendations for the target user may be generated based on those users who are identified as being similar to the target user.

As noted above, the reference data may include the first matrix A and the second matrix B. By applying a clustering technique (e.g., k-nearest neighbors) to the first matrix A, the recommendation engine 110 may identify a first set of users $L_1$ who have a similar employment history as the target user. Alternately and/or additionally, the recommendation engine 110 may apply a clustering technique (e.g., k-nearest neighbors) to the second matrix B to identify a second set of users $L_2$ who have similar career objectives as the target user. Recommendations for the target user may be generated based on the user profiles of the users from the first set of users $L_1$ and/or the second set of users $L_2$. For example, the recommendation engine 110 may query the database 140 in order to retrieve the user profiles of the users in the first set of users $L_1$ and/or the second set of users $L_2$. The user profiles of the users in the first set of users $L_1$ and/or the second set of users $L_2$ may include a plurality of attributes such as, for example, career objectives. The recommendation engine 110 may generate recommendations for the target user based on these attributes. For instance, the recommendation engine 110 may recommend, to the target user, the career objectives of those users who appear in the first set of users $L_1$ and/or the second set of users $L_2$.

In some example embodiments, the recommendation engine 110 may prioritize its recommendations into different tiers. For example, the recommendation engine 110 may prioritize recommendations based on a degree of similarity to the target user and/or any other factors. In order to prioritize recommendations, the recommendation engine 110 may identify users who exhibit different degrees of similarity to the target user by at least performing one or more set operations on the first set of users $L_1$ and the second set of users $L_2$. For instance, the recommendation engine 110 may generate a third set of users $L_3$ by determining, in accordance with Equation (3), an intersection of the first set of users $L_1$ and the second set of users $L_2$. The third set of users $L_3$ may include users who appear in both the first set of users $L_1$ and the second set of users $L_2$. As such, users in the third set of users $L_3$ may have a similar employment history as well as similar career objectives as the target user.

$$L_3 = L_1 \cap L_2 \quad (3)$$

Meanwhile, the recommendation engine may generate a fourth set of users $L_4$ by determining, in accordance with Equation (4), a difference between the first set of users $L_1$ and the third set of users $L_3$. The fourth set of users $L_4$ may include users who only appear in the first set of users $L_1$ but not in the second set of users $L_2$. It should be appreciated that users in the fourth set of users $L_4$ may have a similar employment history as the target user but not similar career objectives as the target user.

$$L_4 = L_1 - L_3 \quad (4)$$

Alternately and/or additionally, the recommendation engine 110 may generate a fifth set of users $L_5$ by determining, in accordance with Equation (5), a difference between the second set of users $L_2$ and the third set of users $L_3$. The fifth set of users $L_5$ may include users who appear only in the second set of users $L_2$ but not in the first set of users $L_1$. The users who appear only in the second set users $L_2$ may have similar career objectives as the target user but not a similar employment history as the target user.

$$L_5 = L_2 - L_3 \quad (5)$$

As noted earlier, the recommendation engine 110 may prioritize its recommendations into different tiers based on a degree of similarity to the target user. Because users in the third set of users $L_3$ may have both a similar employment history and similar career objectives as the target user, the users in the third set of users $L_3$ may exhibit the highest degree of similarity to the target user. Accordingly, the recommendation engine 110 may prioritize recommendations that are made based on the third set of users $L_3$ over other recommendations such as, for example, recommendations that are made based on the fourth set of users $L_4$ and/or the fifth set of users $L_5$. Meanwhile, the users in the fourth set of users $L_4$ may share a similar employment history as the target user while the users in the fifth set of users $L_5$ may share similar career objectives as the target users. Here, the users in the fourth set of users $L_4$ may exhibit a higher degree of similarity to the target user than the users in the fifth set of users $L_5$. Thus, the recommendation engine 110 may prioritize recommendations that are made based on the fourth set of users $L_4$ over recommendations that are made based on the fifth set of users $L_5$. Table 1 below summarizes priorities that may be assigned to recommendations made based on the different sets of users $L_3$ $L_4$, and $L_5$. However, it should be appreciated that the recommendation engine 110 may assign a different priority to the third set of users $L_3$, the fourth set of users $L_4$, and/or the fifth set of users $L_5$.

TABLE 1

| User Set | Priority |
| --- | --- |
| $L_3 = L_1 \cap L_2$ | High |
| $L_4 = L_1 - L_3$ | Intermediate |
| $L_5 = L_2 - L_3$ | Low |

In some example embodiments, the client 120 may interact with the recommendation engine 110 via a user interface 125, which may be a graphic user interface (GUI) and/or any other type of user interface. For example, the user interface 125 may be configured to receive inputs at the client 120 including, for example, the request for the recommendation engine 110 to generate one or more recommendations for the target user. Alternately and/or additionally, the user interface 125 may be configured to display outputs at the client 120 including, for example, the recommendations generated by the recommendation engine 110 for the target user.

It should be appreciated that the recommendation engine 110 may be implemented as a remote service that is accessible via a cloud interface 115. For instance, the recommendation engine 110 may be deployed as a cloud-based software-as-a-service (SaaS). In the case of a cloud-based deployment, a server may provide the SaaS to the client 120 via the network 130. Alternately and/or additionally, the recommendation engine 110 may be implemented locally at the client 120 as software and/or hardware (e.g., field programmable gate arrays (FPGAs), application specific integrated circuits (ASICs), and/or the like).

Figure 2:
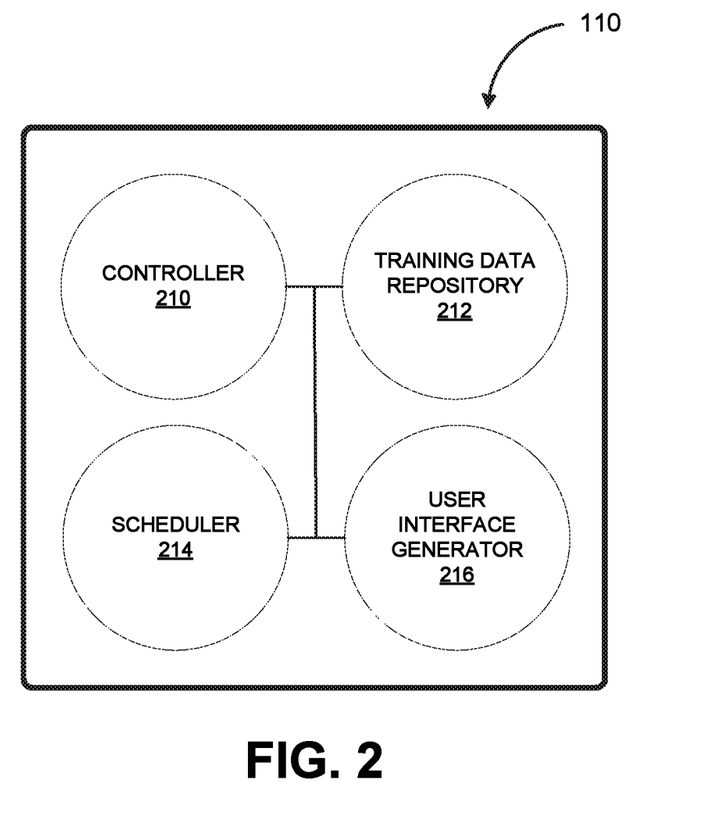
FIG. 2 depicts a block diagram illustrating a recommendation engine, in accordance with some example embodiments.

FIG. 2 depicts a block diagram illustrating the recommendation engine 110, in accordance with some example embodiments. Referring to FIGS. 1-2, the recommendation engine 110 may include a controller 210, a reference data repository 212, a scheduler 214, and a user interface generator 216.

The controller 210 may be configured to generate one or more recommendations based on reference data held in the reference data repository 212. For example, the recommendation engine 110 may receive, from the client 130, a request to generate recommendations for a target user including, for example, recommendations of career objectives. The controller 210 may respond to the request from the client 130 by at least identifying, based on the reference data, one or more career objectives to recommend to the target user.

In some example embodiments, the controller 210 may generate the recommendations by at least identifying users who are similar to the target user. For example, the controller 210 may generate recommendations for career objectives by at least identifying users who have a similar employment history as the target user. Alternately and/or additionally, the controller 210 may generate the recommendations for career objectives by at least identifying users who have similar career objectives as the target user. It should be appreciated that a user may have similar career objectives as the target user because that user shares some of the same career objectives as the target user. However, that user may also have some other career objectives that the target user does not currently have. As such, the controller 210 may recommend, to the target user, at least some of the user's other career objectives. To further illustrate, both the user and the target user may have the career objectives $g_1$, $g_2$, and $g_3$ in common. Thus, the controller 210 may determine that the two users are similar. However, the user may also have a career objective $g_4$, which the target user does not currently have. Accordingly, the recommendations made by the controller 210 may include the career objective $g_4$.

The controller 210 may identify users who are similar to the target user by at least applying, to the reference data, one or more clustering techniques such as, for example, connectivity-based clustering, centroid-based clustering, distribution-based clustering, and/or the like. For example, the controller 210 may apply, to the reference data, a k-nearest neighbors algorithm with Pearson correlation and/or a different clustering technique. As noted earlier, the reference data may include matrix representations of the reference data. For instance, the reference data may include the first matrix A, which correspond the employment histories of a plurality of users. Furthermore, the reference data may include a second matrix B, which corresponds to the career objectives of the plurality of users. It should be appreciated that the employment history and/or the career objectives of the target user are part of the reference data. That is, the first matrix A may include a row that corresponds to the employment history of the target user while the second matrix B may include a row that corresponds to the career objectives of the target user. Thus, applying the clustering technique (e.g., k-nearest neighbors) to the first matrix A may enable the controller 210 to identify the first set of users $L_1$ who have similar employment history as the target user. Meanwhile, applying the clustering technique (e.g., k-nearest neighbors) to the second matrix B may enable the controller 210 to identify the second set of users $L_2$ who have similar career objectives as the target user. According to some example embodiments, the controller 210 may generate recommendations for the target user based at least on the first set of users $L_1$ and/or the second set of users $L_2$.

In order to generate the recommendations for the target user, the controller 210 may query the database 140 to retrieve the user profiles of the users in the first set of users $L_1$ and/or the second set of users $L_2$. For example, the controller 210 may retrieve the user profiles using a SQL statement\ such as, for example, a SQL SELECT. Recommendations for the target user may be generated based on the user profiles of the users in the first set of users $L_1$ and/or the second set of users $L_2$. For example, the user profiles retrieved from the database 140 may include a plurality of attributes associated with the users in the first set of users $L_1$ and/or the second set of users $L_2$. These attributes may include, for example, the career objectives of the users in the first set of users $L_1$ and/or the second set of users $L_2$. Thus, based on the user profiles retrieved from the database 140, controller 210 may recommend, to the target user, the career objectives of the users in the first set of users $L_1$ and/or the second set of users $L_2$.

In some example embodiments, the controller 210 may prioritize recommendations based on a degree of similarity to the target user. Here, the recommendation engine 110 may identify users who exhibit different degrees of similarity to the target user by at least performing one or more set operations on the first set of users $L_1$ and the second set of users $L_2$. For instance, the controller 210 may generate the third set of users $L_3$ by determining the intersection of the first set of users $L_1$ and the second set of users $L_2$. Users in the third set of users $L_3$ may share a similar employment history as well as similar career objectives as the target user. The controller 210 may also generate the fourth set of users $L_4$ by determining the difference between the first set of users $L_1$ and the third set of users $L_3$. Users in the fourth set of users $L_4$ may share a similar employment history as the target user but not similar career objectives. Alternately and/or additionally, the controller 210 may also generate the fifth set of users $L_5$ by determining the difference between the second set of users $L_2$ and the third set of users $L_3$. Users in the fifth set of users $L_5$ may share similar career objectives as the target user but not a similar employment history.

The controller 210 may prioritize recommendations made based on the third set of users $L_3$ over other recommendations because the users in the third set of users $L_3$ may exhibit the highest degree of similarity to the target user. Meanwhile, the controller 110 may prioritize recommendations made based on the fourth set of users $L_4$ over recommendations made based on the fifth set of users $L_5$ because the users in the fourth set of users $L_4$ may exhibit a higher degree of similarity to the target user than the users in the fifth set of users $L_5$. It should be appreciated that the controller 210 may prioritize its recommendations in a different manner and/or according to different factors than the degree of similarity to the target user.

The scheduler 214 may be configured to generate the reference data held in the reference data repository 212. For example, the scheduler 214 may generate the first matrix A and/or the second matrix B based on at least a portion of the user profiles held at the database 140. As such, generating the first matrix A and/or the second matrix B may include retrieving, from the database 140, at least a portion of the user profiles held at the database 140. The scheduler 214 may retrieve the user profiles using a SQL statement such as, for example, a SQL SELECT.

The scheduler 214 may be further configured to synchronize the reference data held in the reference data repository 212 with the user profiles stored at the database 140. The reference data may be synchronized to reflect changes to the user profiles stored at the database 140 including, for example, the addition of a user profile, the deletion of a user profile, and/or the modification of a user profile. According to some example embodiments, the scheduler 214 may be configured to update the reference data in real time by detecting a SQL statement that is indicative of changes being made to a user profile stored at the database 140. For instance, the scheduler 214 may detect a SQL INSERT, a SQL DELETE, a SQL UPDATE, and/or the like. The scheduler 214 may further respond to the SQL statement by updating the reference data held at the reference data repository 212. For example, the scheduler 214 may update the first matrix A and/or the second matrix B in accordance with the user profile that was added, deleted, and/or modified. Alternately and/or additionally, the scheduler 214 may be configured to update the reference data periodically and/or in accordance with a predetermined schedule. Here, the scheduler 214 may update the first matrix A and/or the second matrix B on a weekly basis, a monthly basis, a quarterly basis, and/or the like.

It should be appreciated that updating the reference data may change the clustering of similar users. As such, in some example embodiments, the controller 210 may apply a clustering technique, such as a k-nearest neighbors algorithm, to the updated reference data. For instance, the controller 210 may apply the clustering technique the first matrix A and/or the second matrix B subsequent to the update. Applying the clustering technique to the updated first matrix A may enable the controller 210 to identify at least one different set of users who have a similar employment history. Alternately and/or additionally, applying the clustering technique to the updated second matrix B may enable the controller 210 to identify at least one different set of users who have similar career objectives.

In some example embodiments, the user interface generator 216 may be configured to generate one or more user interfaces such as, for example, graphic user interfaces (GUIs) and/or any other type of user interface. For example, the user interface generator 216 may generate the user interface 125. As noted above, the user interface 125 may be configured to receive inputs to the recommendation engine 110. These inputs may include, for example, the request from the client 120 to generate one or more recommendations for the target user. Alternately and/or additionally, the user interface 125 may be configured to display outputs from the recommendation engine 110. For instance, the user interface 125 may display, at the client 120, recommendations of career objectives generated by the recommendation engine 110 for the target user.

Figure 3:
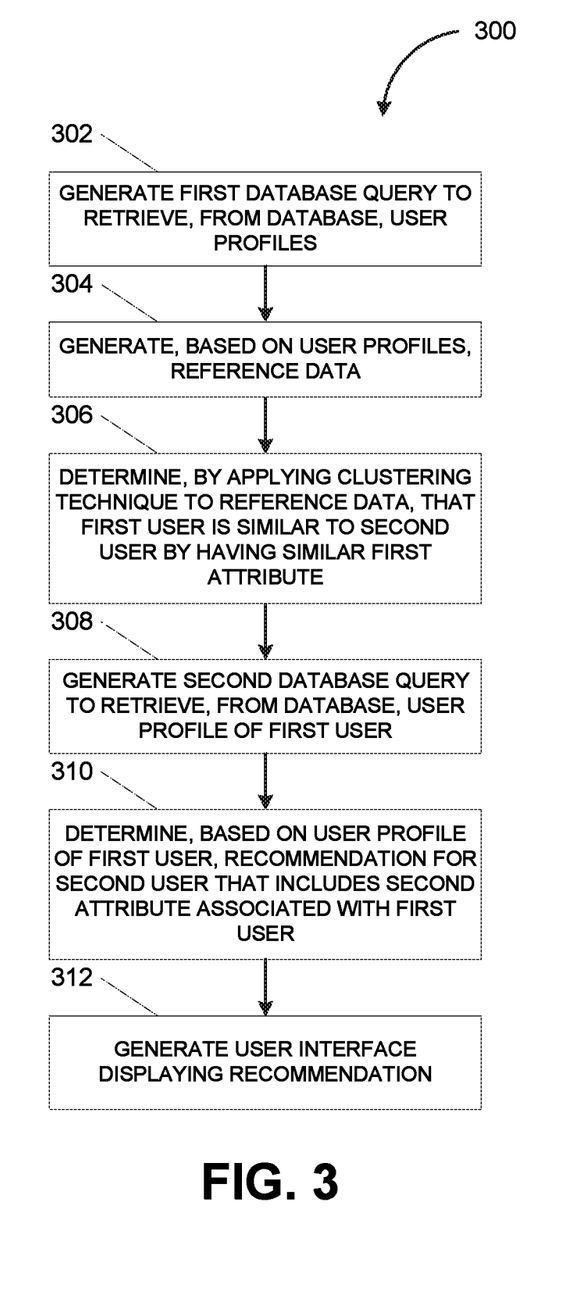
FIG. 3 depicts a flowchart illustrating a process for generating recommendations, in accordance with some example embodiments.

FIG. 3 depicts a flowchart illustrating a process 300 for generating recommendations, in accordance with some example embodiments. Referring to FIGS. 1-3, the process 300 may be performed by the recommendation engine 110.

At 302, the recommendation engine 110 may generate a first database query to retrieve, from a database, a plurality of user profiles. In some example embodiments, the recommendation engine 110 may query the database 140 to retrieve a plurality of user profiles. For example, the recommendation engine 110 may retrieve the user profiles using a SQL statement such as, for example, a SQL SELECT. The user profiles may include a plurality of attributes including, for example, employment history, career objectives, and/or the like.

At 304, the recommendation engine 110 may generate, based at least on the plurality of user profiles, reference data. As noted above, the recommendation engine 110 may generate reference data that includes matrix representations of at least a portion of the user profiles retrieved from the database 140. For example, the recommendation engine 110 may generate the first matrix A, which corresponds to a first attribute (e.g., employment history) in the user profiles retrieved from the database 140. The recommendation engine 110 may further generate the second matrix B, which corresponds to a second attribute (e.g., career objectives) from the user profiles.

At 306, the recommendation engine 110 may determine, by at least applying a clustering technique to the reference data, that a first user is similar to a second user with respect to at least a first attribute. In some example embodiments, the recommendation engine 110 may apply, to the reference data, a clustering technique such as, for example, a k-nearest neighbors algorithm with Pearson correlation and/or the like. Applying the clustering technique to the reference data may generate clusters of similar users who have one or more similar attributes. For example, by applying the clustering technique to the first matrix A, the recommendation engine 110 may identify the first set of users $L_1$ who have a similar employment history as a target user. Alternately and/or additionally, the recommendation engine 110 may apply the clustering technique to the second matrix B to identify the second set of users $L_2$ who have similar career objectives as the target user.

At 308, the recommendation engine 110 may generate a second database query to retrieve, from the database, a user profile of the first user. For example, the recommendation engine 110 may query the database 140 in order to retrieve the user profiles of the users in the first set of users $L_1$ and/or the second set of users $L_2$.

At 310, the recommendation engine 110 may determine, based on the user profile of the first user, a recommendation for the second user that includes the second attribute associated with the first user. As noted above, the user profiles of the users in the first set of users $L_1$ and/or the second set of users $L_2$ may include a plurality of attributes such as, for example, career objectives. Thus, the recommendation engine 110 may generate recommendations for the target user based on these attributes. For instance, the recommendation engine 110 may recommend, to the target user, the career objectives of those users who appear in the first set of users $L_1$ and/or the second set of users $L_2$.

In some example embodiments, the recommendation engine 110 may prioritize its recommendations into different tiers based on the degree of similarity to the target user. The recommendation engine 110 may identify users who exhibit different degrees of similarity to the target user by at least performing one or more set operations on the first set of users $L_1$ and the second set of users $L_2$. For example, the recommendation engine 110 may determine the intersection of the first set of users $L_1$ and the second set of users $L_2$ to generate the third set of users $L_3$. The recommendation engine 110 may also determine the difference between the first set of users $L_1$ and the third set of users $L_3$ to generate the fourth set of users $L_4$. Alternately and/or additionally, the recommendation engine 110 may determine the difference between the second set of users $L_2$ and the third set of users $L_3$ to generate the fifth set of users $L_5$. Users in the third set of users $L_3$, the fourth set of users $L_4$, and the fifth set of users $L_5$ may exhibit different degrees of similarity relative to the target user. Thus, recommendations made based on the third set of users $L_3$, the fourth set of users $L_4$, and the fifth set of users $L_5$ may be associated with different priorities. For example, recommendations made based on the third set of users $L_3$ may be associated with the highest priority because users from the third set of users $L_3$ have a similar employment history and similar career objectives as the target user.

At 312, the recommendation engine 110 may generate a user interface displaying the recommendation. For example, the recommendation engine 110 may generate the user interface 125. The user interface 125 may be a graphic user interface (GUI) that is configured to display, at the client 120, the recommendations generated by the recommendation engine 110.

Table 2 below depicts pseudo program code for generating recommendations. In some example embodiments, the pseudo program code shown in Table 1 may implement the process 300 for generating recommendations.

TABLE 2

```
public List getGoalRecommendation(String userID) {
    KNearestNeighbors goalKNN=new KNearestNeighbors(goalMatrix);
    List<String> L1=goalKNN.getSimiliarUsers(userID);
    KNearestNeighbors jobKNN=new KNearestNeighbors(jobMatrix);
    List<String> L2=jobKNN.getSimiliarUsers(userID);
    // Goals of the users of set L1 are extracted and kept
    // on list goalsOfL1
    List<String> goalsOfL1 = fetchGoalsOfSetOfUsers(L1);
    // Goals of the users of set L2 are extracted and kept
    // on list goalsOfL2
    List<String> goalsOfL2 = fetchGoalsOfSetOfUsers(L2);
    //Initialize L3: Set of users who belong to both L1 and L2;
    // i.e. L3 = L1 ∩ L3
    Set<String> L3 = new HashSet<String>(L1);
    L3.retainAll(L2);
    // Goals of the users of set L3 are extracted and kept
    // on list goalsOfL3
    List goalsOfL3 = fetchGoalsOfSetOfUsers(L3);
    /* Ranking of goals should be on the following order:
     *
     * For an employee e = L3, goals of e should be given highest
     * priority /ranking
     * For an employee e = L1, goals of e should be given second
     * highest priority /ranking
     * For an employee e = L2, goals of e should be given
     * lowest priority /ranking
     *
     * The rankedGoals List will contain the goals in a non-increasing
     * order of priority.
     **/
    List rankedGoals = new ArrayList( );
    rankedGoals = rankedGoals.add(goalsOfL3);
    rankedGoals = rankedGoals.add(goalsOfL1);
    rankedGoals = rankedGoals.add(goalsOfL2);
    return rankedGoals;
}
```

Figure 4:
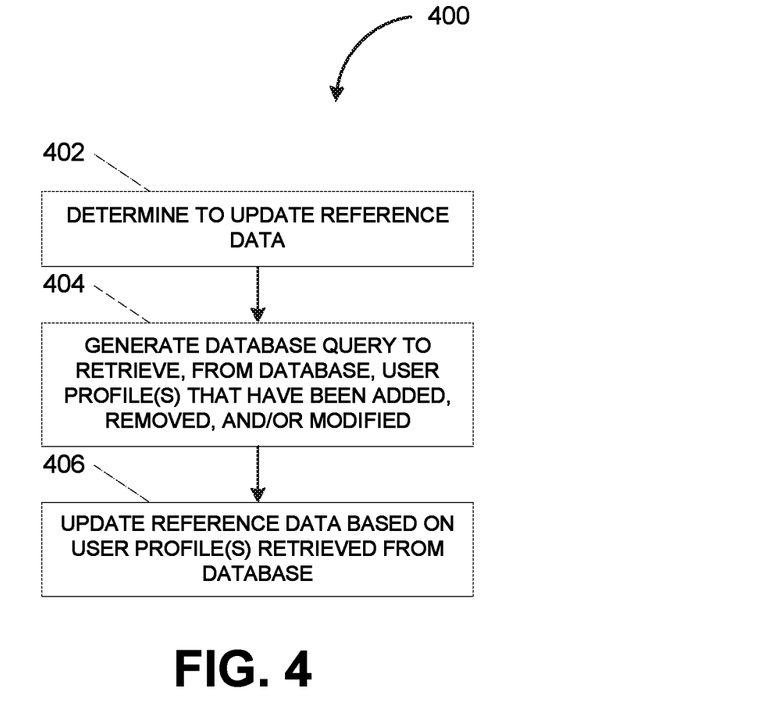
FIG. 4 depicts a flowchart illustrating a process for synchronizing reference data, in accordance with some example embodiments.

FIG. 4 depicts a flowchart illustrating a process 400 for synchronizing reference data, in accordance with some example embodiments. Referring to FIGS. 1-2 and 4, the process 400 may be performed by the recommendation engine 110, for example, by the scheduler 214.

At 402, the recommendation engine 110 may determine to update at least a portion of the reference data. In some example embodiments, the recommendation engine 110 may be configured to synchronize, in real time, the reference data with the user profiles held at the database 140. As such, the recommendation engine 110 may determine to update the reference data whenever the recommendation engine 110 detects a SQL statement that is indicative of a change being made to a user profile stored at the database 140. For example, the recommendation engine 110 may determine to update the reference data when the recommendation engine 110 detects a SQL INSERT, a SQL DELETE, a SQL UPDATE, and/or the like. Alternately and/or additionally, the recommendation engine 110 may be configured to synchronize the reference data periodically and/or in accordance with a predetermined schedule. For example, the recommendation engine 110 may update the reference data on a weekly basis, a monthly basis, a quarterly basis, and/or the like.

At 404, the recommendation engine 110 may generate a database query to retrieve, from a database, one or more user profiles that have been added, removed, and/or modified. In some example embodiments, to perform real time synchronization, the recommendation engine 110 may query the database 140 to retrieve the user profiles that was added, removed, and/or modified by the SQL statement detected by the recommendation engine 110. Alternately and/or additionally, to perform a periodic and/or scheduled update, the recommendation engine 110 may query the database 140 to retrieve the users profiles that were added, removed, and/or modified since a previous update.

At 406, the recommendation engine 110 may update the reference data based on the one or more user profiles retrieved from the database. For example, the recommendation engine 110 may update, based on the user profiles retrieved from the database 140, the first matrix A and/or the second matrix B. As noted earlier, updating the reference data may also change the clustering of similar users. Thus, in some example embodiments, the recommendation engine 110 may apply a clustering technique (e.g., k-nearest neighbors) to the first matrix A and/or the second matrix B subsequent to the update.

Table 3 below depicts pseudo program code for synchronizing reference data. In some example embodiments, the pseudo program code shown in Table 3 may implement the process 400 for synchronizing reference data.

TABLE 3

```
/**
 * This method will syncronize the data models:
 *  1) Goal Matrix
 *  2) Job  Matrix
 * and update the models after a time interval T.
 */
public void syncDataModels( ){
    while(true){
        List<String> employees=null;
        if(lastRun==null ){
            goalMatrix=new int[COUNT_EMPLOYEES] [COUNT_GOAL];
            jobMatrix=new int[COUNT_EMPLOYEES] [COUNT_JOBS];
            employees= getAllEmployeesFromDB( );/* this method will return list
                 of targeted employees of an organization form the db.*/
            lastRun= new Timestamp(System.currentTimeMillis( ));
        }else{
          Timestamp   currentTimeStamp=new Timestamp( );
          currentTiemStamp = new Timestamp(System.currentTimeMillis( ));
          employees= getListOfUpdatedEmployeesFromDB(lastRun,currentTimeStamp);
          lastRun= currentTimeStamp;
        }
        for(String employee:users) {
            // get the list of goals and it's corresponding weights/rating.
            /*
             * For each goal percentage G of an employee's goal, rating R is
             * calculated by goalsAndCorrespondingRatingsOfEmployee
             * as tabulated below:
             *
             * |---------------------------------------------------------------|
             * |      Goal Percentage (G)        |      Ranking (R)       |
             * |    (as given by the Employee)   |      of the goal       |
             * |---------------------------------------------------------------|
             * |        0%  - 20%                |            1           |
             * |       20% - 40%                 |            2           |
             * |       40% - 60%                 |            3           |
             * |       60% - 80%                 |            4           |
             * |       80% - 100%                |            5           |
             * |---------------------------------------------------------------|
             *
             */
            Map<Integer, Integer> goalIdRating = new Map<Integer, Integer>( );
            goalIdRating=goalsAndCorrespondingRatingsOfEmployee(employee);
            // get the job history of user, All the job roles user had worked
            // in the past.
            List<Integer> jobIds=jobHistoryOfEmployee(employee);
            // This method will update matrix based on the partial updated
            GoalRecommendationEngine++Pesudocode.java
                // data received inprevious step.
                updateGoalMatrix(goalMatrix,goalIdRating,employee);
                //update the jobMatrix for the user.
                updateJobMatrix(jobMatrix,jobIds,employee);
        }
        Thread.sleep(T);// Now it will go to sleep for T milliseconds.
                 // T can be configured.
    }
}
```

Figure 5:
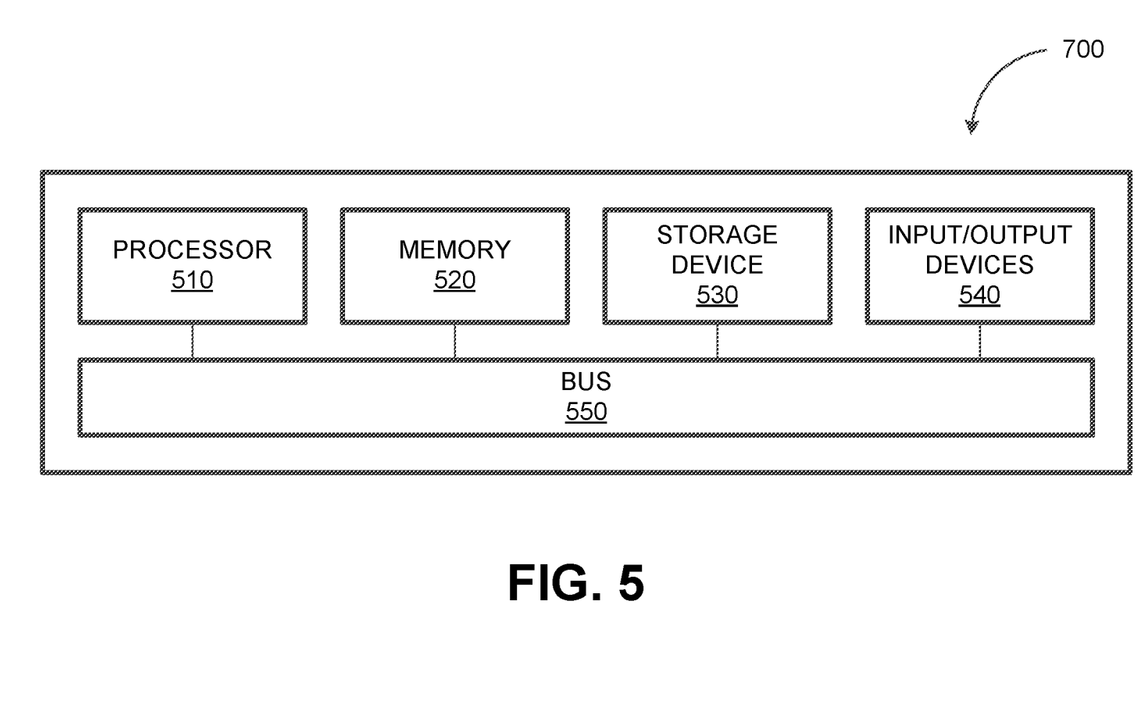
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the recommendation engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the recommendation engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
generating, by a recommendation engine, a first database query to retrieve a plurality of user profiles from a database, the plurality of user profiles including a first attribute associated with a plurality of users and a second attribute associated with the plurality of users;
generating, by the recommendation engine, reference data based at least on the plurality of user profiles, and the reference data comprising matrix representations of the plurality of user profiles;
determining, by the recommendation engine applying a clustering technique to the reference data, that a first user of the plurality of users is similar to a second user of the plurality of users with respect to the first attribute and the second attribute;
determining, by the recommendation engine applying the clustering technique to the reference data, that the second user is similar to a third user of the plurality of users with respect to the first attribute but not the second attribute;
in response to determining that the first user is similar to the second user, generating, by the recommendation engine, a second database query to retrieve a first user profile of the first user from the database and a third database query to retrieve a second user profile of the third user; and
determining, by the recommendation engine, a first recommendation and a second recommendation for the second user, wherein
the first recommendation determined based at least on the first user profile of the first user, the first recommendation including the second attribute associated with the first user, and
the second recommendation determined based at least on the second user profile of the third user, and the second recommendation including the second attribute associated with the third user.

2. The computer-implemented method of claim 1, wherein the reference data comprises a first matrix and a second matrix, the first matrix comprising the first attribute associated with the plurality of users, the second matrix comprising the second attribute associated with the plurality of users, the first attribute and the second attribute being different types of attributes.

3. The computer-implemented method of claim 1, further comprising:
prioritizing, by the recommendation engine, the first recommendation over the second recommendation, the prioritizing being based at least on the first user being similar to the second user with respect to more attributes than the third user.

4. The computer-implemented method of claim 1, wherein the clustering technique comprises k-nearest neighbors.

5. The computer-implemented method of claim 1, further comprising:
detecting, by the recommendation engine, a change to at least one user profile at the database;
in response to detecting the change, generating, by the recommendation engine, a third database query to retrieve, from the database, the at least one user profile that has been changed; and
updating the reference data based on the at least one user profile that has been changed.

6. The computer-implemented method of claim 1, further comprising:
generating, by the recommendation engine, a graphic user interface displaying the first recommendation and the second recommendation.

7. The computer-implemented method of claim 1, wherein the recommendation engine is implemented as a cloud service accessible to a first client and a second client, the first client accessing a first instance of the recommendation engine, and the second client accessing a second instance of the recommendation engine.

8. A system, comprising:
at least one data processor; and
at least one memory storing instructions which, when executed by the at least one data processor, result in operations comprising:
generating, by a recommendation engine, a first database query to retrieve a plurality of user profiles from a database, the plurality of user profiles including a first attribute associated with a plurality of users and a second attribute associated with the plurality of users;
generating, by the recommendation engine, reference data based at least on the plurality of user profiles, and the reference data comprising matrix representations of the plurality of user profiles;
determining, by the recommendation engine applying a clustering technique to the reference data, that a first user of the plurality of users is similar to a second user of the plurality of users with respect to the first attribute and the second attribute;
determining, by the recommendation engine applying the clustering technique to the reference data, that the second user is similar to a third user of the plurality of users with respect to the first attribute but not the second attribute;
in response to determining that the first user is similar to the second user, generating, by the recommendation engine, a second database query to retrieve a first user profile of the first user from the database and a third database query to retrieve a second user profile of the third user; and
determining, by the recommendation engine, a first recommendation and a second recommendation for the second user, wherein
the first recommendation determined based at least on the first user profile of the first user, the first recommendation including the second attribute associated with the first user, and
the second recommendation determined based at least on the second user profile of the third user, and the second recommendation including the second attribute associated with the third user.

9. The system of claim 8, wherein the reference data comprises a first matrix and a second matrix, the first matrix comprising the first attribute associated with the plurality of users, the second matrix comprising the second attribute associated with the plurality of users, the first attribute and the second attribute being different types of attributes.

10. The system of claim 8, further comprising:
prioritizing, by the recommendation engine, the first recommendation over the second recommendation, the prioritizing being based at least on the first user being similar to the second user with respect to both the first attribute and the second attribute.

11. The system of claim 8, wherein the clustering technique comprises k-nearest neighbors.

12. The system of claim 8, further comprising:
detecting, by the recommendation engine, a change to at least one user profile at the database;
in response to detecting the change, generating, by the recommendation engine, a third database query to retrieve, from the database, the at least one user profile that has been changed; and
updating the reference data based on the at least one user profile that has been changed.

13. The system of claim 8, further comprising:
generating, by the recommendation engine, a graphic user interface displaying the first recommendation and the second recommendation.

14. A non-transitory computer-readable storage medium including program code, which when executed by at least one data processor, cause operations comprising:
generating, by a recommendation engine, a first database query to retrieve a plurality of user profiles from a database, the plurality of user profiles including a first attribute associated with a plurality of users and a second attribute associated with the plurality of users;
generating, by the recommendation engine, reference data based at least on the plurality of user profiles, and the reference data comprising matrix representations of the plurality of user profiles;
determining, by the recommendation engine applying a clustering technique to the reference data, that a first user of the plurality of users is similar to a second user of the plurality of users with respect to the first attribute and the second attribute;
determining, by the recommendation engine applying the clustering technique to the reference data, that the second user is similar to a third user of the plurality of users with respect to the first attribute but not the second attribute;
in response to determining that the first user is similar to the second user, generating, by the recommendation engine, a second database query to retrieve a first user profile of the first user from the database and a third database query to retrieve a second user profile of the third user; and
determining, by the recommendation engine, a first recommendation and a second recommendation for the second user, wherein
the first recommendation determined based at least on the first user profile of the first user, the first recommendation including the second attribute associated with the first user, and
the second recommendation determined based at least on the second user profile of the third user, and the second recommendation including the second attribute associated with the third user.

* * * * *